United States Patent [19]

Hobday et al.

[11] 3,892,876
[45] July 1, 1975

[54] PROCESS OF PREPARING FREEZE-DRIED GELATIN

[75] Inventors: Trevor Maurice Norwood Hobday, High Wycombe; Graham William Jordan, Machen, both of England

[73] Assignees: P. Leiner & Sons (Wales) Limited; Ranks Hovis McDougall Limited, both of London, England

[22] Filed: Nov. 27, 1972

[21] Appl. No.: 309,783

[30] Foreign Application Priority Data
Nov. 30, 1971   United Kingdom............... 55541/71

[52] U.S. Cl................................ 426/576; 426/444
[51] Int. Cl. ............................................. A23j 1/10
[58] Field of Search..................... 426/385, 168, 350

[56] References Cited
UNITED STATES PATENTS
2,166,074   7/1939   Reichel............................. 426/385
2,819,971   1/1958   Gunthardt.......................... 426/168

*Primary Examiner*—A. Louis Monacell
*Assistant Examiner*—J. M. Hunter
*Attorney, Agent, or Firm*—Stevens, Davis, Miller & Mosher

[57] ABSTRACT

The solubility of gelatin in water at temperatures of the order of 15°C to 20°C is substantially improved by effecting a rapid freezing of an aqueous gelatin sol containing at least 10 percent w/w of gelatin, and then subjecting the frozen gelatin sol to an accelerated freeze-drying process before any melting of the frozen aqueous gelatin sol is permitted. The method, which is capable of operation on a commercial scale, includes an essential step of rapid freezing by spraying the aqueous gelatin sol on to a refrigerated surface whilst maintaining relative movement between the spray and the refrigerated surface, so that sprayed particles of sol freeze directly to the refrigerated surface. The frozen aqueous gelatin sol is then removed from the refrigerated surface before that surface is subjected to further spraying of the sol.

10 Claims, 4 Drawing Figures

PROCESS OF PREPARING FREEZE-DRIED GELATIN

This invention relates to gelatin and more particularly to a method of improving the solubility of gelatin in cold water, that is to say in water at temperatures of the order of 15°C to 20°C, whilst substantially retaining the gelling property of the gelatin.

In its normal commercial form gelatin is in the form of a gel and is essentially insoluble in cold water. This commercial form of gelatin is obtained by the conventional manufacturing process which involves extraction of gelatin from bones, skins or connective tissue after partial hydrolysis of the collagen under acidic or alkaline conditions to give a colloidal solution, which is an aqueous gelatin sol. Cooling of the aqueous gelatin sol produces a gel, and the commercial form of the gel is obtained by reducing its water content in a drying step. The commercial gelatin in the form of a gel can be reconverted into an aqueous gelatin sol by dissolving in hot water, that is to say in water at a temperature of at least 40°C.

It is well-known that there is an essential difference between the gelatin sol and the gelatin gel in that the gelatin sol exhibits the essential flow characteristics of any aqueous solution, whereas the gelatin gel behaves like a jelly. The transition from the sol to the gel may result from a change in one or more parameters. In the simple case of an aqueous gelatin sol at an elevated temperature, cooling causes the transition from the sol to the gel to take place. However the transition from the sol to the gel may be effected by evaporating water from a dilute aqueous gelatin sol and thereby increasing the concentration of the gelatin sol whilst maintaining the temperature essentially constant.

It is the ability of gelatin to gel and produce a jellylike material, which makes it a commercially useful material, particularly in the foodstuffs industry. The gelling property of gelatin is measured in terms of Bloom Strength.

When gelatin is used in the foodstuffs industry it is used as an aqueous solution of gelatin which subsequently gels. The fact that commercial gelatin, formed by the conventional manufacturing process, is in the form of a gel means that it has always been necessary to use hot water in order to convert this conventional commercial gelatin, in the form, for example, of powder, kibbles or sheets into an aqueous gelatin sol, in order to make use of the gelling property of the gelatin. The desirability of being able to use this property by dissolving gelatin in cold water is obvious. Accordingly, many attempts have been made to produce gelatin in a form in which it will dissolve in cold water.

One early method of producing gelatin in a form which is capable of dissolving in cold water is described in U.S. Pat. Specification No. 2,166,074 of Reichel which was published in 1939. In order to make the gelatin soluble in water, Reichel produced it in the form of a highly porous, friable mass having a sponge-like structure. He achieved this by freezing a thinly fluid gelatin solution (i.e. a gelatin solution of low concentration) and then freeze-drying the frozen material. Reichel specifically states that the solutions which are to be frozen contain from about 0.1 percent to about 2 percent of gelatin, and he also teaches that the more concentrated solutions of gelatin give the products which are less soluble in water, and that the aqueous gelatin solution which is subjected to freeze-drying should not contain substantially more than 2 percent of gelatin. Experiments repeating the methods described by Reichel have confirmed his conclusion and it has been found that, although the gelatin product of his process has an improved solubility in water, the product obtained by freeze-drying a 2 percent solution of gelatin is markedly less soluble in water at 20°C than the product obtained by freeze-drying the 0.1 percent solution of gelatin. While the product obtained by freeze-drying a 0.1 percent solution of gelatin is soluble to the extent of 2 percent w/w at 20°C, the product obtained by freeze-drying a 2 percent solution of gelatin is not soluble to the extent of 2 percent w/w at 20°C and, in fact, is not completely soluble in water at 20°C at lower concentrations.

However, the quantity of water which has to be removed in order to produce a dried gelatin product having an improvement in solubility is so large (ranging from approximately 50 times the weight of dried gelatin product in the case of a 2 percent solution of gelatin to 1000 times in the case of a 0.1 percent solution of gelatin) that Reichel's gelatin product cannot be regarded as anything more than a laboratory specimen. The process is much too uneconomical for use on a commercial scale.

British Patent Specification No. 1,215,707 of Charier Vadrot, which was published in 1970, describes a process for treating collagen in order to improve its resistance to heat. The process involves freezing a hydrated product comprising collagen or partially hydrolysed collagen (gelatin) and not more than 3 percent by weight of water, and then freeze-drying the frozen product. As an optional feature, the Specification of Charier-Vadrot mentions that, if good solubility of gelatin in the cold state is also desired, a small proportion of a weak acid or a sucrose ester should be added to the primary product before freezing, and Example 3 of the Specification describes a process in which 0.1 percent of sucrose monostearate was incorporated in a primary gelatin. Best attempts to follow Example 3 of U.K. Specification No. 1,215,707 have failed to produce a gelatin having an improved solubility in water at 20°C as compared with the conventional commercial gelatin hitherto obtainable.

U.K. Specification No. 1,230,531, which was published in 1971, contains a review of a number of methods proposed for preparing gelatin in a state in which it is soluble in cold water. The majority of these methods, which include dehydration of gelatin with hot polar solvents and dehydration of gelatin foams using a band drier, have been impractical for general commercial use on economic grounds. Accordingly, the only process which has been used commercially in order to improve the solubility of gelatin in cold water is a process which involves spray-drying an aqueous mixture of gelatin and sugar. However, for success, this process has required the use of a very large sugar concentration, for example, from four to eight times the gelatin concentration when the sugar used is sucrose. U.K. Specification No. 1,230,531, however, proposes a process in which glucose is mixed with the gelatin, instead of sucrose, in an aqueous solution which is spray-dried, and this process is stated to enable the proportion of gelatin to sugar present in the dried product to be increased substantially, and even to as much as 50 percent. Nevertheless, the dried gelatin product contains large quantities of sugar and is only suitable for uses in which the presence of sugar is desired. Also, the solubility of the gelatin treated by the process of U.K. Specification No. 1,230,531 is still not sufficiently improved for heating of the gelatin in water to a temperature substantially above 20°C to be avoided when the gelling property of the gelatin is to be utilised.

Accordingly, all the prior methods have fallen short of the desired improvement in gelatin in at least one of two ways. In the first place, all of the prior methods have either failed to improve the solubility of the treated gelatin in water at 20°C to the level which is desirable in order to make effective use of the gelling property of the gelatin or they are incapable of being practised on a commercial scale. In the second place the only prior method of improving the solubility of gelatin in cold water which has proved capable of being practised commercially has suffered from the disadvantage that the treated gelatin is heavily diluted with another material such as sucrose or glucose.

The present Applicants have devoted considerable thought to the problem of producing a gelatin which is soluble in cold water. As the most recent view expressed in U.K. Patent Specification No. 1,230,531 indicated that this problem was equivalent to the problem of producing a dried gelatin none of which was in the form of the gel, and, as already explained, the transition from sol to gel may result either from cooling of the aqueous gelatin sol or from removal of water from the aqueous gelatin sol, the problem seemed to be incapable of solution.

Nevertheless the present Applicants have directed experiments to the freeze-drying of an aqueous gelatin sol in an attempt to produce a process which was capable of being operated economically on a commercial scale to increase the solubility of gelatin in cold water. In view of Reichel's work, which produced a limited improvement in solubility when very dilute aqueous gelatin solutions were treated and which taught that even this improvement in solubility was not maintained when the gelatin concentration was raised, and in view of the known inevitability of the formation of a gel on cooling of an aqueous gelatin sol, it was not to be expected that freeze-drying of an aqueous gelatin sol, which necessarily involves a preliminary freezing step, would provide a substantial improvement in solubility when used for aqueous gelatin sols having at least 10 percent gelatin concentrations. Indeed the present Applicants discovered that freezing of an aqueous gelatin sol having a gelatin concentration in excess of 10 percent, as a preparatory step to freeze-drying, produced a slab of solid material which was extremely difficult to dry in a freeze-drier, which was very difficult to grind down, and which did not dissolve in cold water after the treatment in the freeze-drier.

As a result of further experimental work extending over a substantial period, the present Applicants have now made the surprising discovery that gelatin which is soluble in cold water to an extent sufficient to enable a jelly to be produced, and which does not have substantial quantities of another material present, may be produced by a freezedrying process on a scale which is capable of being used commercially, provided that the aqueous gelatin solution or sol which is to be submitted to freeze-drying, and which contains more than 10 percent by weight of gelatin, is frozen by spraying on to a refrigerated surface whilst maintaining relative movement between the spray and the refrigerated surface, so that sprayed particles of gelatin solution freeze directly to the refrigerated surface, and provided that these frozen particles are removed from the refrigerated surface before any further spraying of aqueous gelatin solution on to the refrigerated surface takes place. Once frozen, the aqueous gelatin solution is maintained below its freezing point continuously until the water content has been reduced by freeze-drying to a level of about 5 percent, which is a typical water content for freeze-dried materials.

When the aqueous gelatin solution is sprayed on to the refrigerated surface, the sprayed material will freeze as particles which may be discrete particles, or which may be in contact with one another so that a discontinuous film or lace-like network is formed.

The product which is obtained by freezing an aqueous gelatin solution in this way and then freeze-drying the frozen material is a dry gelatin product having a substantially increased solubility in cold water. When this product is reduced in particle size to less than 100 mesh sieve, the powdered gelatin was found to dissolve in cold water at a temperature of 20°C, on stirring, to form a 2 percent solution which subsequently set into a firm jelly.

It is thought that one essential characteristic of the freezing step, which is preliminary to freeze-drying in accordance with the present invention, is that it must be sufficiently rapid for the aqueous gelatin solution to be frozen solid in a time too fast for the gelatin to pass from the sol state to the gel state. However, this is a tentative theory which has not yet been proved.

Nevertheless there are limits to the speed at which freezing of the aqueous gelatin sol can be effected without destroying the desirable gelling property of the gelatin. In some experiments an aqueous gelatin sol was frozen using liquid nitrogen (the aqueous gelatin sol being dripped or sprayed into the liquid nitrogen), and it was found that this frozen gelatin sol could be freeze-dried and was indeed relatively soluble in cold water, but the dissolved gelatin did not produce a jelly. In fact the gelling property of the gelatin had been so reduced that the Bloom Strength of the gelatin was almost nil.

In accordance with the present invention, therefore, there is provided a method of treating gelatin to improve its solubility in cold water whilst substantially retaining its gelling property, the method comprising the steps of spraying an aqueous gelatin sol having a gelatin concentration of at least 10 percent w/w on to a refrigerated surface whilst maintaining relative movement between the spray of aqueous gelatin sol and the refrigerated surface so that the particles of aqueous gelatin sol which comprise the spray freeze directly to the refrigerated surface, removing the frozen aqueous gelatin sol from the refrigerated surface after a single passage of the spray over the refrigerated surface, melting of the frozen aqueous gelatin sol being prevented while the frozen aqueous gelatin sol is being removed from the refrigerated surface, and freeze-drying the frozen aqueous gelatin sol to recover gelatin therefrom before any melting of the frozen aqueous gelatin sol is permitted.

Experiments made by the present Applicants have shown that the cooling of the aqueous gelatin sol in the freezing step must be carried out in a very particular manner if the gelatin product obtained after freeze-drying is not to contain substantial quantities of insoluble gelatin. The Applicants have found that, if the aqueous gelatin sol is frozen by being sprayed on to frozen gelatin sol already present on the refrigerated surface, the frozen material contains gelatin in two distinct phases. One of these phases of gelatin is soluble in cold water, while the other phase is not. It is thought that the soluble gelatin phase is frozen gelatin sol, and that the insoluble gelatin phase is frozen gelatin which has proceeded to the gel state. The Applicants have also found that the frozen gelatin material is liable to contain gelatin in the insoluble phase when the particles of gelatin, which are frozen on to the refrigerated surface, are large particles produced by sputtering, or particles of such a size that the frozen gelatin on the refrigerated surface has a thickness substantially in excess of 0.050 inches when the temperature of the refrigerated surface is of the order of −20°C.

When a sol having a relatively high gelatin concentration is used, the increased viscosity of the sol inevitably leads to the formation of a coarser spray and a thicker film. Within experimental limits which can be determined, a greater thickness of film can be compensated by lowering the temperature of the refrigerated surface, thereby increasing the temperature drop and the speed of freezing so that there is obtained a frozen gelatin sol in which substantially all the gelatin is in the soluble phase.

Accordingly, the method in accordance with the present invention should result in an aqueous gelatin sol being cooled sufficiently rapidly from a temperature at which no gelling of the gelatin has occurred to a temperature sufficiently below the freezing point of the particular aqueous gelatin sol to ensure that freezing of the material occurs before any substantial formation of gelatin in the insoluble phase, thought to be the gel, can take place, if substantially all the gelatin is to be obtained in the soluble phase. However, as will be explained later, a proportion of insoluble gelatin may be tolerated in certain applications of a cold water soluble gelatin in the foodstuffs industry, provided that the gelatin as a whole is sufficiently soluble to produce a jelly.

The Applicants have further discovered that it is essential for the aqueous gelatin sol, when once frozen, to be maintained completely frozen if gel in the insoluble phase (thought to be gelatin in the gel phase) is not to be formed. However, the frozen aqueous gelatin sol should preferably be processed in the freeze-drier within three hours of manufacture, because the quality and properties of the gelatin are liable to deteriorate when the gelatin is held in the frozen state, even though the frozen material is maintained at −25°C to −30°C.

In the detailed description of the invention which follows there will be described a method of treating gelatin to improve its solubility in cold water whilst substantially retaining its gelling property, the method comprising the steps of delivering an aqueous gelatin sol, having a gelatin concentration of at least 10 percent w/w, to a spray gun at a temperature at which all the gelatin is present in the form of the sol, spraying the aqueous gelatin sol on to the external surface of a refrigerated drum whilst maintaining relative movement between the spray gun and the external surface of the refrigerated drum, the conditions, including the temperature of the external surface of the refrigerated drum, being such that the particles of aqueous gelatin sol which are sprayed on to the external surface of the refrigerated drum freeze directly to the said external surface, removing frozen gelatin sol from the external surface of the refrigerated drum before further spraying of the said external surface takes place, and subjecting the particles of frozen gelatin sol to freeze-drying to recover gelatin therefrom, the gelatin sol being maintained frozen during the whole period between the formation of the film and the commencement of the freeze-drying step, and the recovered gelatin being substantially all in a soluble form.

Advantageously, the refrigerated drum is rotated, freezing of the aqueous gelatin sol on the external surface of the refrigerated drum is completed within three quarters of a revolution of the drum from the position of the spray gun, a flexible doctor blade removes the frozen gelatin sol from the surface of the refrigerated drum, and the frozen gelatin sol which is removed from the surface of the drum falls under gravity into a cold room maintained at a temperature not higher than −20°C.

Preferably the spray gun is a fixed spray gun which delivers aqueous gelatin sol on to the external surface of the refrigerated drum as a fan-shaped spray producing, on the said external surface, a spray pattern, which, although it is elliptical, closely approaches a straight line pattern. However, the spray gun need not be fixed and could have a component of motion in a direction parallel to the axis about which the drum is rotating. Also a plurality of spray guns may be used.

Advantageously, however, the or each spray gun has a central nozzle from which the sol is ejected and an external air nozzle consisting of two jets disposed on opposite sides of the central nozzle to assist in atomization of the gelatin sol and to provide a suitably shaped spray pattern.

It has been found that treatment of gelatin in any aqueous gelatin sol by the method of the present invention improves the solubility of that gelatin in cold water. However, in order to maximise the gelling property of the gelatin it is preferred for the aqueous gelatin sol which is frozen and subsequently freeze-dried to be a gelatin sol obtained in the process of manufacturing gelatin by extraction from natural sources of gelatin (such as animal bones, skins and connective tissues) so that the gelatin in this aqueous gelatin sol has not previously gelled.

In some circumstances it is advantageous for other ingredients to be dissolved in the aqueous gelatin sol before it is subjected to the treatment in accordance with the present invention. In particular, if the gelatin is to be used in the manufacture of certain table products, either in the foodstuffs industry or by the housewife, material such as fruit extracts may be dissolved in the aqueous gelatin sol before it is subjected to the treatment in accordance with the present invention. Since inclusion of additional material will lower the freezing point of the aqueous gelatin sol, appropriate adjustment of the process parameters should be made. The product of the treatment can then be a powdered material which can be supplied direct to a factory for use or immediately packaged for marketing. More specifically in accordance with this aspect of the present invention, the aqueous gelatin sol which is sprayed on to the refrigerated surface includes other edible ingredients for a dessert product, such as, for example, a table jelly or a mousse, or for an aspic. The other edible ingredients which may be included in the aqueous gelatin sol may be, for example one or more of sugars and artificial sweeteners, natural and artificial flavouring agents, colouring agents, fruit acids, buffering agents, emulsifying agents and thickening agents.

Advantageously, the film of frozen gelatin sol is treated by coarse grinding or granulating after removal from the refrigerated surface and before freeze-drying commences. The grinding or granulating treatment facilitates the freezedrying of the mateiral by increasing the surface area. Also, the transfer of heat through the particles which have been granulated or ground during the freeze-drying process can occur efficiently and uniformly. Thirdly, the grinding or granulating is advantageous in that the increase in the bulk density of the frozen material which results enables a greater mass of the frozen material to be loaded into a freeze-drier of given volume.

The solubility of gelatin treated by a method in accordance with the present invention is improved by reducing the particle size of the recovered gelatin, for example, to a particle size such that the gelatin will pass a 30 mesh sieve, and best results are obtained when the particle size is so reduced that the gelatin will pass a 100 mesh sieve.

The present invention also comprehends gelatin whenever treated by the method of the present invention.

Specifically, the present invention comprehends gelatin in the form of a powder having a particle size less than 100 mesh sieve and capable of dissolving in water at 20°C to form a 2 percent solution of gelatin in water.

In accordance with the present invention there is also provided a powdered material having a particle size less than 100 mesh sieve and consisting essentially of gelatin capable of dissolving in water at 20°C to an extent of 2 percent by weight.

Further in accordance with the present invention there is provided a powdered material having a particle size less than 100 mesh sieve and comprising gelatin capable of dissolving in water at 20°C to an extent of 2 percent by weight, and other edible ingredients of a dessert product or an aspic. When the powdered material is to be used to make a dessert product or aspic which is transparent, a surface active agent is preferably included in an amount of from 0.001 percent to 1.0 percent based on the weight of gelatin.

The invention will be better understood from the following detailed description which is made, by way of example, and with reference to the accompanying drawings, in which.

Figure 1:
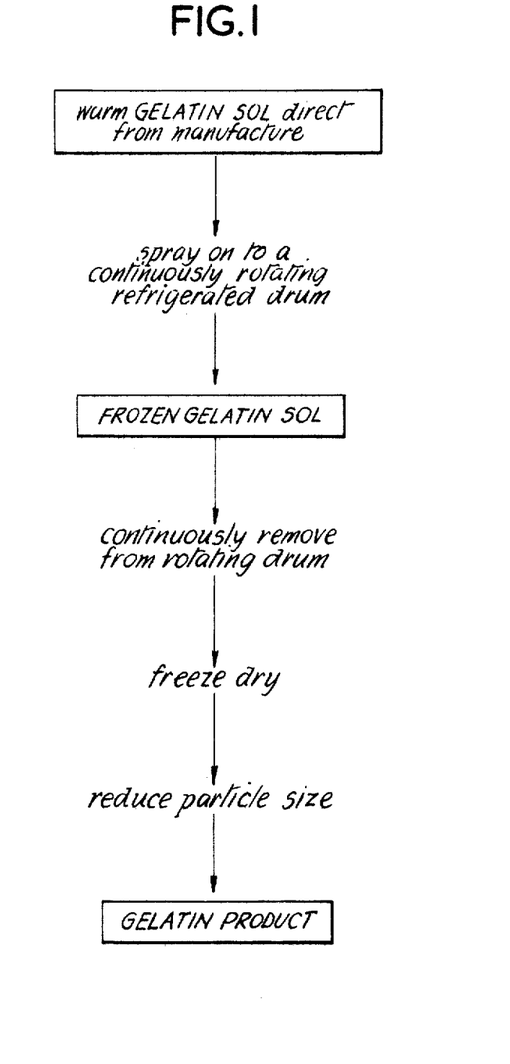
FIG. 1 is a flow diagram which shows briefly the sequence of steps in the method of the present invention.

Referring to FIG. 1 of the drawings the general steps in the method according to the present invention are illustrated. A warm aqueous gelatin sol having a gelatin concentration of at least 10 percent w/w, and preferably of the order of 20 percent w/w or more, is taken direct from a gelatin manufacturing process, and fed to an appropriate nozzle from which the gelatin sol is sprayed on to the surface of a continuously rotating refrigerated drum.

The temperature of the gelatin sol in the nozzle from which it is sprayed is in the range of 40°C to 60°C, and is preferably of the order of 45°C to 50°C. In any particular process the temperature of the gelatin sol emitted from the nozzle should be maintained substantially constant.

The gelatin sol is sprayed on to the surface of the refrigerated drum in a spray pattern which is elliptical, with the minor axis of the ellipse small in comparison with the major axis, and preferably line contact between the spray and the surface of the drum is approached by using a spray having a fan shape. Different types of nozzle may be used to form the spray, provided that the spray is relatively fine, although difficulties may occur in the removal of the frozen spray from the drum surface if the spray is too fine. On the other hand, sputtering of the spray, with the consequential deposit of large droplets on the drum surface, must be avoided because the outer surfaces of large droplets do not freeze quickly enough for the frozen gelatin sol to be all in the water soluble form. Therefore the spray should be a fine spray, but not as fine as a "mist".

The surface of the refrigerated drum is maintained at a temperature in a range from −10°C to −60°C, preferably in a range from −20°C to −50°C, by circulating refrigerating fluid inside the drum. Sufficiently rapid freezing of the aqueous gelatin sol as it is sprayed on to the surface of the refrigerated drum is assured when the temperature of the surface of the drum is maintained at about −20°C. The time within which the aqueous gelatin sol must be frozen is dependent on the concentration of the sol, quicker freezing being essential for higher concentrations. Generally the freezing of the aqueous gelatin sol should take place in a time not longer than five seconds, and preferably within two or three seconds. For an aqueous gelatin sol containing 20 percent by weight of gelatin freezing is achieved in a time of the order of one second from the time at which the spray is formed.

The gelatin sol freezes on the surface of the refrigerated drum as the individual particles impinge on the surface of the drum, so that the frozen gelatin sol is in the form of a discontinuous film or lace-like network of frozen material. The thickness of the frozen gelatin sol on the surface of the drum is preferably not greater than 0.050 inches, because it has been found that if the gelatin sol is applied to the surface of the drum in a manner which produces too great a thickness of the frozen material, a proportion of insoluble gelatin, probably in the form of a gel, is present on the outer part of the frozen gelatin sol.

A doctor blade, which is continuously in contact with the surface of the rotating drum, removes the frozen gelatin sol which falls directly into a chamber maintained at a temperature not higher than −20°C, and preferably between −30°C and −50°C, so that the frozen gelatin sol is not permitted to melt. The frozen gelatin sol is then subjected to an accelerated freeze-drying process, after which the particle size of the dried gelatin product is reduced using an impact mill, so that the final gelatin product has a particle size less than 30 mesh, and preferably less than 100 mesh. The final product is found to have a solubility of at least 50 percent when two parts of the product are introduced into 100 parts of water at 20°C.

Figure 2:
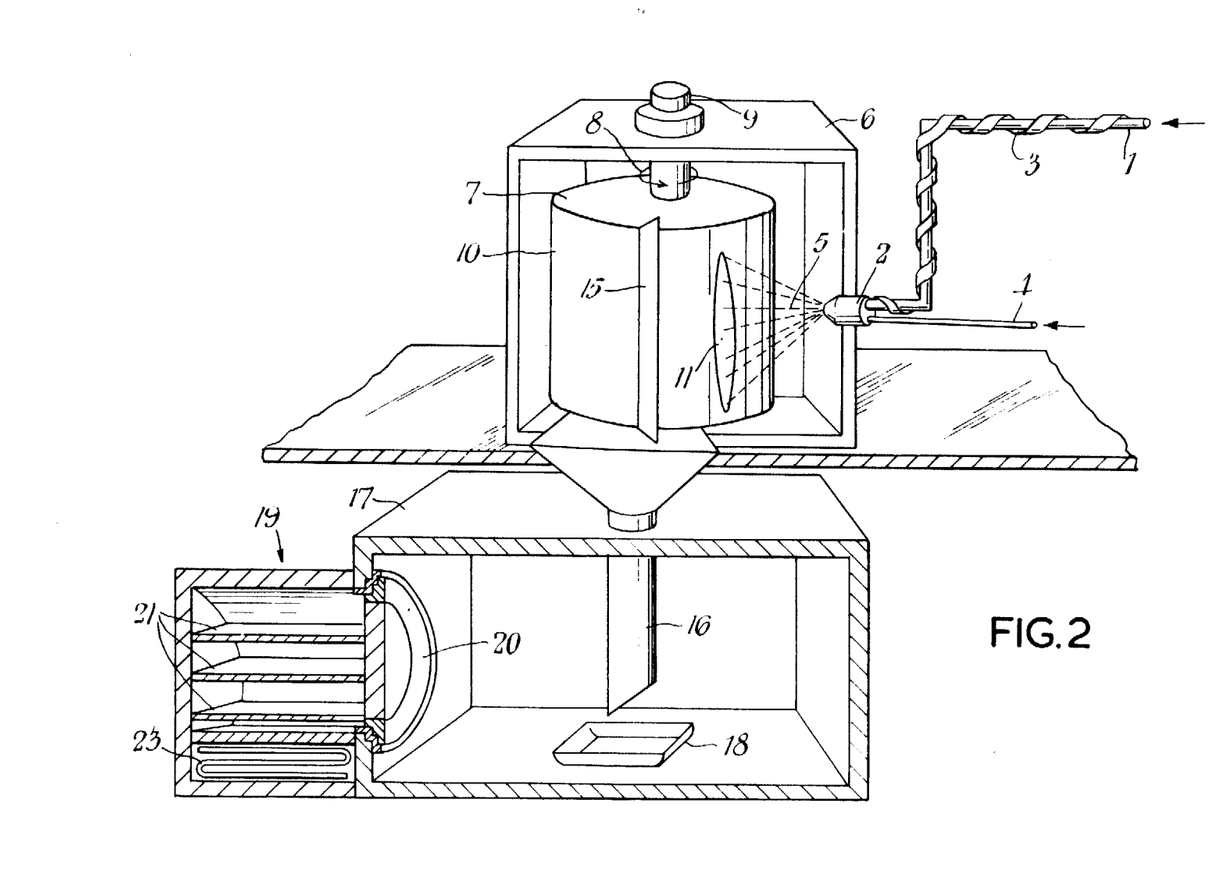
FIG. 2 is a schematic perspective view partly in cross-section of a preferred apparatus for carrying out the method of the present invention.

Reference will now be made to FIG. 2 of the accompanying drawings which shows an arrangement of apparatus for carrying out the method described with reference to FIG. 1. In one particular example, a warm aqueous gelatin sol at a temperature of the order of 45°C and having a concentration of 20 percent w/w is obtained directly from the manufacturing process of gelatin from natural sources, such as animal bones or skin, and is passed along a pipeline 1 to a spray gun 2. The spray gun 2 has a hot water jacket which maintains the gelatin sol at the temperature of 45°C until the sol is emitted from the nozzle of the spray gun 2.

In FIG. 2 the pipeline 1 is shown as equipped with thermostatically controlled electrical tracing 3 for maintaining the gelatin sol in the pipeline 1 at the desired temperature of 45°C. However, the electrical tracing 3 may be dispensed with if the length of the pipeline 1 is sufficiently short for substantial cooling of the aqueous gelatin sol during its passage along the pipeline 1 to be avoided.

The spray gun 2 is also fed with compressed air from a compressor (not shown) along a pipeline 4. The compressor, which feeds oil-free air to the spray gun 2 at a pressure of the order of 30 to 40 p.s.i., is preferably not equipped with an after-cooler, so that warm air is delivered to the spray gun 2.

In this embodiment of the invention the spray gun 2 has an external air nozzle consisting of two jets disposed on opposite sides of a central nozzle from which the sol is ejected, with the result that a fan-shaped spray 5 is produced. It has been found that the use of a spray gun having an external air supply is advantageous in keeping the nozzle of the spray gun 2 clean, and one suitable construction of spray gun having an external air nozzle will be described in detail with reference to FIG. 3 of the accompanying drawings.

Because the air supply from the compressor is at a warm temperature, cooling of the aqueous sol in the formation of the spray 5 at the outlet from the spray gun 2 is lessened.

The spray gun 2 is mounted in front of or fixed to an open-fronted cabinet 6 within which a refrigerated drum 7 is mounted for rotation about a vertical axis. The direction of rotation of the refrigerated drum 7 is indicated by an arrow 8 in FIG. 2, the rotation being effected by an electric motor 9. The nozzle of the fixed spray gun 2 is so spaced from the external surface 10 of the refrigerated drum 7 that aqueous gelatin sol is delivered from the spray gun 2 on to the external surface 10 in an elliptical spray pattern 11 extending over a majority of the vertical length of the external surface 10, but over a relatively small width of the external surface 10. A convenient spacing of the nozzle of the spray gun 2 from the external surface 10 is about 24 inches, the diameter of the drum being of the order of 36 inches.

Refrigerating fluid is circulated within the drum 7 at a temperature and speed such as to maintain the external surface 10 of the drum refrigerated at a temperature of the order of −20°C.

Whilst relative movement between the external surface 10 of the drum 7 and the spray gun 2 is maintained, the aqueous gelatin sol delivered to the spray gun 2 is sprayed on to the external surface 10 of the drum 7, where it becomes rapidly frozen. At a speed of rotation of the refrigerated drum 7 of 6 revolutions per minute, the gelatin sol has been found to become frozen after the external surface 10 of the drum has rotated through approximately 30° from the position at which the spray deposits on the external surface 10. It is estimated that the aqueous gelatin sol becomes frozen in about one second from the time at which the spray is formed at the nozzle of the spray gun 2.

The spray of aqueous gelatin sol deposits on the external surface 10 of the drum 7 in a large number of discrete drops which freeze as discrete drops, some of which are partially fused together so that the frozen material is a mixture of powder and a lace-like sheet. It is particularly important that the thickness of the sol which deposits on the external surface 10 of the drum 7 be relatively thin, and preferably substantially less than 0.050 inches in thickness, so that heat from the external surface of the sprayed sol is quickly transferred through the sprayed material and is removed in the refrigerating fluid which is cooling the external surface 10 of the drum 7. In the example described it is found that the frozen gelatin sol has a thickness of the order of 0.020 to 0.030 inches, which indicates that the sprayed sol has a similar thickness.

A flexible doctor blade 15 is mounted in contact with the external surface 10 of the refrigerated drum 7 and removes the frozen gelatin sol from the refrigerated surface 10. In order to make maximum use of the refrigerated surface 10, the flexible doctor blade 15 should preferably be located about one quarter of a revolution of the drum in advance of the region of the external surface 10 upon which the aqueous gelatin sol is sprayed, and the rate of revolution of the drum should be adjusted so that the aqueous gelatin sol has just frozen when it reaches the flexible doctor blade 15, for example after three-quarters of a revolution of the drum.

The flexible doctor blade 15 itself should be in sufficient contact with the external surface 10 so that substantially all the frozen gelatin sol is removed from the external surface 10. The flexible doctor blade 15 is made of a flexible steel and should be sufficiently flexible for any irregularities in the external surface 10 to be accommodated, and scoring of the external surface 10 to be substantially avoided, whilst effective removal of the frozen gelatin sol from the surface 10 is achieved.

If all the frozen gelatin sol is not removed by the flexible doctor blade 15, the frozen material which adheres to the refrigerated external surface 10 passes beneath the spray 5 again and a layer of gelatin sol is sprayed over the original layer of frozen gelatin sol. This second layer is therefore insulated from the external surface 10 of the refrigerated drum7 and may not freeze sufficiently quickly to prevent the formation of some gelatin in a form which is not soluble in cold water.

The frozen gelatin sol scraped from the external surface 10 of the refrigerated drum 7 falls vertically under gravity through a shaft 16 located directly beneath the flexible doctor blade 15, and into a cold room 17 located directly beneath the refrigerated drum 7 where the frozen material is collected in trays 18. During its fall through the shaft 16 the frozen material should not touch any surface, and must certainly not adhere to any surface at a temperature above the freezing-point of the sol, because it is found that material which does so adhere changes from the soluble form of gelatin (presumed to be the sol) to the insoluble form (presumed to be the gel).

The temperature of the cold room is maintained at a temperature of about −40°C so that the frozen gelatin sol is not permitted to melt after leaving the external surface 10 of the refrigerated drum 7.

The frozen gelatin sol which collects in the tray 18 is then reduced in size by coarse grinding or granulating, and the resulting gelatin sol is loaded into a freeze-drier 19 which is situated adjacent the cold room 15. The trays 18 of frozen gelatin sol may thus be loaded into the freeze-drier 19 through a hatch 20 without being exposed to a higher temperature than the temperature of the cold room 17.

In order to effect freeze-drying of the frozen gelatin sol, the hatch 20 of the freeze-drier 19 is replaced after the trays of frozen gelatin sol have been put into the freeze-drier and steps are taken to ensure that the frozen gelatin sol is at a temperature of about −40°C before freeze-drying commences. The pressure in the freeze-drier 19 is then reduced to the order of 0.1mm of mercury. Inside the freeze-drier 19 there are plates 21 between which the trays 18 of frozen gelatin sol are supported. These plates 21 are then heated up to a temperature of the order of 50°–60°C in the initial stages of accelerated freeze-drying, the temperature of the plates being reduced to about 30°C as the freeze-drying proceeds. The gelatin product which is being treated in the freeze-drier should not be allowed to reach a temperature above 30°C during the process in order to avoid de-naturing the gelatin. The pressure in the freeze-drier is maintained at about 0.1mm of mercury throughout the freeze-drying process. The ice which sublimes from the frozen gelatin sol is collected on a series of condenser tubes 23. When the accelerated freeze-drying process is completed, usually after about 12–14 hours, nitrogen or air is amditted into the freeze-drier 19 to increase the pressure to atmospheric pressure, and the freeze-dried gelatin sol is removed from the freeze-drier 19.

The gelatin which is recovered from the freeze-drier is found to be capable of dissolving in cold water at an improved rate of dissolution compared with the rate of dissolution of gelatin produced by conventional processes. However, the solubility of recovered gelatin is further improved by effecting a reduction in the particle size of the gelatin by impact milling, and preferably the size of the gelatin particles is reduced so that the final gelatin product will pass a 100 mesh British Standards Specification sieve.

If the gelatin is allowed to stand in a moist atmosphere for prolonged periods of time, it will take up moisture from the atmosphere, and this moisture uptake is associated with a deterioration in the ability of the gelatin to dissolve in cold water. Consequently, if the gelatin prepared in accordance with the present invention is to be stored, it should be protected from atmospheric moisture, for example by packaging the gelatin airtight and moistureproof plastic bags or containers.

The process and apparatus which have been described in detail with reference to FIG. 2 may be modified within the scope of the present invention, for example, a curtain of air at a temperature substantially below the freezing temperature of the aqueous gelatin sol may be maintained around at least part of the external surface 10 of the drum 7 to assist in the freezing of the aqueous gelatin sol. The air curtain may be advantageously employed in the vicinity of the doctor blade 15 to assist in directing the frozen material down the shaft 16 and in maintaining the material frozen during transit to the cold room 17.

In the process described above with reference to the accompanying drawings, the original warm gelatin sol is a sol prepared during the manufacture of gelatin from natural sources. However, the gelatin sol may be obtained from other sources, for example from gelatin in the form of a loose particulate gel for example gelatin in the form of powder, kibbles or sheets. Gelatin in the form of kibbles may be made up into a sol by soaking one part by weight of gelatin with four parts by weight of water for a period of about half an hour in a container at room temperature, after which there is a raising of temperature accompanied by stirring. The raising of the temperature of the container and its contents is effected either by immersing the container in heated water at a temperature in the range of 60° to 80°C, or by circulating heated fluid through a jacket which surrounds the container.

The temperature of the mixture including the gelatin is raised to a temperature in the range of 40° to 60°C, preferably about 45°C. After the temperature has been maintained at 45°C for about 1 hour, with stirring, the loose particulate gel will have melted and dissolved in the water to form a 20 percent gelatin sol. If desired, compensation for evaporative losses may be made, and then the sol is passed into the apparatus shown in FIG. 2 along the pipeline 1.

Figure 3:
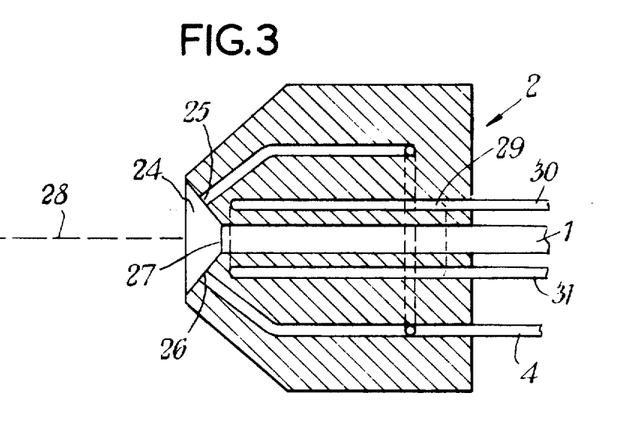
FIG. 3 is a cross-sectional view of a preferred form of spray gun for use in the apparatus of FIG. 2.
Figure 4:
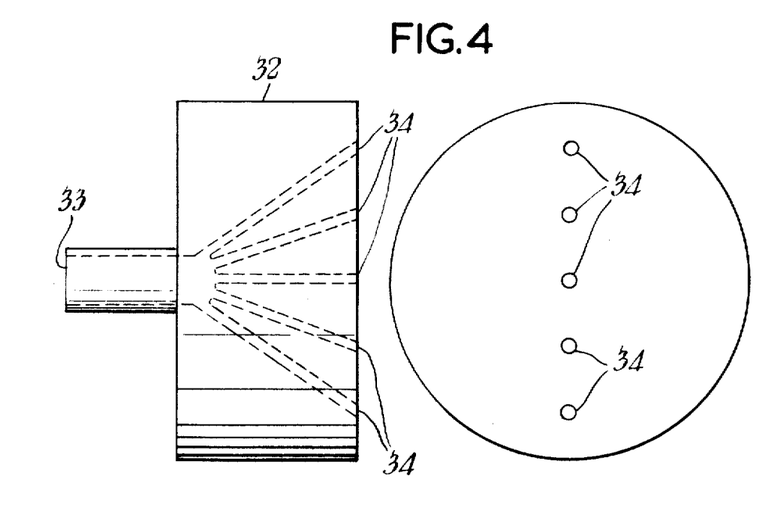
FIG. 4 shows two views of an alternative form of nozzle which can be used in the spray gun forming part of the apparatus of FIG. 2.

Referring to FIG. 3, there is shown a cross-sectional view of the spray gun 2 of this embodiment of the invention, the cross-section being taken along a horizontal plane. The spray gun 2 has an external air nozzle 24 consisting of two air jets 25 and 26 on opposite sides of a central nozzle 27 through which the aqueous gelatin sol is ejected, with the result that a fan-shaped spray is formed. This fan-shaped spray lies substantially in the plane indicated by a dashed line 28.

In order to prevent gel formation within the central nozzle 27, the spray gun 2 is kept at the temperature of 45°C by means of a hot water jacket 29. The hot water jacket 29 is supplied from a hot water supply (not shown) via the pipes 30 and 31.

In the particular process being described, an oilfree air stream is supplied to the air jets 25 and 26 at a pressure of 30 to 40 p.s.i. through a pipeline 4 at a rate of 3 to 4 cubic feet per minute. As previously stated, the air supply to the pipeline 4 is from a compressor (not shown) which is not equipped with an after-cooler, so that the air delivered to the spray gun 2 is warm and, consequently, cooling of the aqueous gelatin sol in the formation of the spray at the external air nozzle 24 is minimized.

Alternatively, the spray gun 2 may be of the type in which the gelatin sol is atomized by means of compressed air within the spray gun 2. A suitable nozzle for such a spray gun 2 is illustrated in FIG. 4. This nozzle 32 is made of nylon, and is provided with a single inlet port 33 which is connected to the pipeline 1 carrying the gelatin sol and to the pipeline 4 carrying the compressed air, which for this nozzle 32 is at a pressure of the order of 100 p.s.i. and is delivered at a rate of approximately 10 cubic feet per minute. This single inlet port 33 communicates with five outlet ports 34. The atomized gelatin sol is ejected from the outlet ports 34 and forms a fan-shaped spray which is directed on to the external surface 10 of the refrigerated drum 7 in an elliptical spray pattern. When this nozzle 32 is used, the spacing of the nozzle 32 from the external surface 10 of the refrigerated drum 7 is from 12 to 18 inches.

Using the spray gun 2 of FIG. 3 it has been found that an aqueous gelatin sol having a concentration of 25 percent by weight of gelatin can be sprayed on to a refrigerated drum for a limited period. However, at this concentration, the nozzle 24 of the spray gun 2 becomes gradually coated with gelatin so that the spraying process has to be discontinued and the nozzle 24 cleaned. It is believed that a special deisgn of spray gun will enable the difficulty to be overcome and aqueous gelatin sols having a concentration of as much as 30 percent or more of gelatin to be sprayed continuously on to a refrigerated surface.

The method of the present invention aims to produce a solid gelatin, substantially the whole of which can dissolve in cold water to form a solution which subsequently gels. Such a product would be used in the foodstuffs industry in the manufacture of aspics or dessert products such as, for example, clear table jellies and mousses. When the gelatin produced by the method of the invention contains a minor proportion of gelatin in a form which is insoluble in cold water, however, this material would not be suitable for making up into clear table jellies since the insoluble gelatin would cloud the jelly. If, however, the gelatin was to be used, for example, in the production of milk-based jellies or as an extender for cream, the presence of a minor proportion of insoluble gelatin would be acceptable, because the final appearnace of the product would not be affected by the presence of the insoluble gelatin, provided that a sufficient proportion of the gelatin was soluble in cold water.

It has been found that, when two parts by weight (in grams) of gelatin, treated in accordance with the preferred method of the present invention which has been described, are added gradually to one hundred parts by volume (in millilitres) of cold water at 20°C, while stirring, the gelatin is soluble in the cold water to give a solution of gelatin which will set to give a firm jelly. The process of forming this jelly from the treated gelatin is clearly a two stage process. The gelatin is added gradually to the water with stirring, and the stirring is continued for about three minutes to dissolve the material. After standing for about 30 minutes in a domestic refrigerator, the solution sets to give the firm jelly. The gelatin is found to have 90 percent or more of the gelling property which is present in a sample of similar gelatin which has not been submitted to the method of the present invention, and which is used with hot water to form a jelly.

While gelatin treated in accordance with the preferred embodiment of this invention and having a particle size less than 30 mesh sieve is soluble in cold water to an extent of about 60 percent, better solubility (approaching 100%) is obtained using treated gelatin having its particle size further reduced so that all the gelatin passes 100 mesh sieve.

However, there is a tendency for entrapped air to be present in the jelly formed from the treated gelatin, this air forming a layer, which is not transparent, near the surface of the jelly. In order to reduce this undesired effect, a small proportion, i.e. from 0.001 to 1.0 percent based on the weight of the gelatin, of a surface active agent is incorporated in the aqueous gelatin sol which is fed to the spray gun 2. The preferred surface active agent is polyoxyethylene sorbitan monolaurate which is incorporated in the aqueous gelatin sol in a proportion of 0.01 percent based on the weight of the gelatin. The surface active agents acts as an antifoaming additive.

Gelatin treated in accordance with the present invention to improve its solubility in cold water whilst retaining its gelling property need not be mixed with any other material. It therefore has the further advantage over the spray-dried gelatins, which are mixed with a sugar in the known process designed to improve the water solubility of the gelatin, that the product of the method of the present invention is not limited to applications where a sweetening effect is acceptable, and may be used, for example, in conjunction with meat and savoury products.

As previously indicated, however, in cases where the treated gelatin is to be marketed in powdered form with other edible ingredients, e.g. as a concentrate for making a table jelly, the other ingredients of the concentrate may be mixed with the aqueous gelatin sol before this is sprayed on to the external surface of the refrigerated drum in the method which has been particularly described. Alternatively, such other ingredients in dried powder form may be mixed in with the dried final product.

We claim:

1. A method of treating gelatin to improve its solubility in cold water whilst substantially retaining its gelling property, the method comprising the steps of spraying an aqueous gelatin sol having a gelatin concentration of at least 10 percent w/w on to a refrigerated surface whilst maintaining relative movement between the spray of aqueous gelatin sol and the refrigerated surface so that the particles of aqueous gelatin sol which comprise the spray freeze directly to the refrigerated surface, removing the frozen aqeuous gelatin sol from the refrigerated surface after a single passage of the spray over the refrigerated surface, melting of the frozen aqueous gelatin sol being prevented while the frozen aqueous gelatin sol is being removed from the refrigerated surface, and freeze-drying the frozen aqueous gelatin sol to recover gelatin therefrom before any melting of the frozen aqueous gelatin sol is permitted.

2. A method of treating gelatin to improve its solubility in cold water whilst substantially retaining its gelling property, the method comprising the steps of delivering an aqueous gelatin sol, having a gelatin concentration of at least 10 percent w/w, to a spray gun at a temperature at which all the gelatin is present in the form of the sol, spraying the aqueous gelatin sol on to the external surface of a refrigerated drum whilst maintaining relative movement between the spray gun and the external surface of the refrigerated drum, the conditions, including the temperature of the external surface of the refrigerated drum, being such that the particles of aqueous gelatin sol which are sprayed on to the external surface of the refrigerated drum freeze directly to the said external surface, removing frozen gelatin sol from the external surface of the refrigerated drum before further spraying of the said external surface takes place, and subjecting the particles of frozen gelatin sol to freeze-drying to recover gelatin therefrom, the gelatin sol being maintined frozen during the whole period between the formation of the film and the commencement of the freeze-drying step, and the recovered gelatin being substantially all in a soluble form.

3. A method according to claim 2, wherein the refrigerated drum is rotated, freezing of the aqueous gelatin sol on to the external surface of the refrigerated drum is completed within three quarters of a revolution of the drum from the position of the spray gun, a flexible doctor blade removes the frozen gelatin sol from the surface of the refrigerated drum, and the frozen gelatin sol which is removed from the surface of the drum falls under gravity into a cold room maintained at a temperature not higher than −20°C.

4. A method according to claim 2 wherein the spray gun is a fixed spray gun which delivers aqueous gelatin sol on to the external surface of the refrigerated drum as a fan-shaped spray producing an elliptical spray pattern on the said external surface.

5. A method according to claim 2 wherein the spray gun has an external air nozzle consisting of two jets disposed on opposite sides of a central nozzle from which the sol is ejected.

6. A method according to claim 1, wherein the aqueous gelatin sol is a sol prepared during the manufacture of gelatin by extraction from sources such as animal bones, skins and connective tissue.

7. A method according to claim 6 wherein the aqueous gelatin sol includes other edible ingredients for a dessert product or an aspic.

8. A method according to claim 2 wherein freeze-drying is facilitated by first treating the frozen gelatin sol by coarse grinding or granulating.

9. A method according to claim 2 wherein the gelatin recovered from the frozen gelatin sol by freeze-drying is reduced in size to a particle size less than 30 mesh sieve.

10. A method according to claim 9 wherein the gelatin recovered from the frozen gelatin sol by freeze-drying is reduced in size to a particle size less than 100 mesh sieve.

* * * * *